(12) United States Patent
Lau et al.

(10) Patent No.: US 11,356,537 B2
(45) Date of Patent: Jun. 7, 2022

(54) SELF-LEARNING CONNECTED-DEVICE NETWORK

(71) Applicants: AT&T INTELLECTUAL PROPERTY I, L.P., Atlanta, GA (US); AT&T Mobility II LLC, Atlanta, GA (US)

(72) Inventors: Erie Lai Har Lau, Redmond, WA (US); Lan Scott, Redmond, WA (US); Brandon Duong, Bothell, WA (US)

(73) Assignees: AT&T INTELLECTUAL PROPERTY I, L.P., Atlanta, GA (US); AT&T MOBILITY II LLC, Atlanta, GA (US)

( * ) Notice: Subject to any disclaimer, the term of this patent is extended or adjusted under 35 U.S.C. 154(b) by 34 days.

(21) Appl. No.: 16/299,088

(22) Filed: Mar. 11, 2019

(65) Prior Publication Data
US 2020/0296186 A1 Sep. 17, 2020

(51) Int. Cl.
*H04L 29/08* (2006.01)
*H04L 12/24* (2006.01)
(Continued)

(52) U.S. Cl.
CPC ............ *H04L 67/36* (2013.01); *G06N 20/00* (2019.01); *H04L 41/16* (2013.01); *H04L 43/02* (2013.01);
(Continued)

(58) Field of Classification Search
CPC ........ H04L 67/10; H04L 67/12; H04L 67/20; H04L 67/32; H04L 67/36; H04L 41/22; H04L 41/145; H04L 41/0893; H04L 41/5009; H04L 43/50; H04L 41/16; H04L 43/02; H04L 43/062; H04L 41/04; H04L 41/0806; H04L 43/065; H04L 12/24; H04L 12/26; H04L 12/2803; H04L 29/08;
(Continued)

(56) References Cited

U.S. PATENT DOCUMENTS 9,741,183 B2 * 8/2017 Matos ................... H04W 48/20
10,003,909 B2    6/2018 Altay et al.
(Continued)

OTHER PUBLICATIONS

Bhide VH, Wagh S. i-learning IoT: An intelligent self learning system for home automation using IoT. In2015 International Conference on Communications and Signal Processing (ICCSP) Apr. 2, 2015 (pp. 1763-1767). IEEE. (Year: 2015).*

*Primary Examiner* — James N Fiorillo
(74) *Attorney, Agent, or Firm* — Amin, Turocy & Watson, LLP

(57) ABSTRACT

A connected-device network can continually learn from abstract sensory data (e.g., speech processing, cognitive inference, and/or computer vision image segmentation) and can generate never-seen-before data in real time. In one aspect, the network devices extract important correlations in the sensor data based on network data collected at different time slice and/or locations. Further, underlying relationships in a set of data can be detected as the sensor data transverses through different layers of the network. Moreover, the network devices can provide logic in different layers to help classify the sensor data early in the detection process (e.g., instead of waiting for it to reach its final destination).

20 Claims, 12 Drawing Sheets

(51) Int. Cl.
  *H04L 12/26* (2006.01)
  *G06N 20/00* (2019.01)
  *H04W 4/38* (2018.01)
  *H04L 67/75* (2022.01)
  *H04L 41/16* (2022.01)
  *H04L 43/02* (2022.01)
  *H04L 43/062* (2022.01)
  *H04L 67/12* (2022.01)

(52) U.S. Cl.
  CPC ............ *H04L 43/062* (2013.01); *H04W 4/38* (2018.02); *H04L 67/12* (2013.01)

(58) Field of Classification Search
  CPC .......... G06N 20/00; G06N 7/00; G06N 7/005; H04W 4/38; H04W 4/70; G05B 19/4185; A63F 13/30
  USPC .................................................. 709/223, 224
  See application file for complete search history.

(56) References Cited

U.S. PATENT DOCUMENTS

| | | | | |
|---|---|---|---|---|
| 10,007,513 | B2 * | 6/2018 | Malladi | G06F 8/70 |
| 2015/0134801 | A1 * | 5/2015 | Walley | H04L 43/50 |
| | | | | 709/223 |
| 2016/0381146 | A1 | 12/2016 | Zhang et al. | |
| 2017/0094018 | A1 * | 3/2017 | Ekstrom | H04L 67/10 |
| 2017/0118620 | A1 * | 4/2017 | Norlin | H04W 8/005 |
| 2017/0155703 | A1 * | 6/2017 | Hao | H04L 67/12 |
| 2017/0339245 | A1 * | 11/2017 | Pacella | H04L 67/32 |
| 2018/0019929 | A1 * | 1/2018 | Chen | H04L 41/145 |
| 2018/0041904 | A1 * | 2/2018 | Shimojou | H04W 16/02 |
| 2018/0123878 | A1 * | 5/2018 | Li | H04L 47/70 |
| 2018/0167370 | A1 * | 6/2018 | Frahim | H04L 63/102 |
| 2018/0199279 | A1 * | 7/2018 | Baek | H04W 48/06 |
| 2018/0264347 | A1 * | 9/2018 | Tran | A63B 71/145 |
| 2018/0284735 | A1 * | 10/2018 | Cella | G05B 13/028 |
| 2018/0295465 | A1 * | 10/2018 | Generes, Jr. | H04W 4/80 |
| 2018/0316615 | A1 * | 11/2018 | Shaw | H04L 41/0806 |
| 2018/0321356 | A1 * | 11/2018 | Kulkarni | G01S 5/14 |
| 2018/0330293 | A1 * | 11/2018 | Kulkarni | G06K 19/0723 |
| 2018/0332434 | A1 * | 11/2018 | Kulkarni | H04W 4/35 |
| 2018/0343567 | A1 * | 11/2018 | Ashrafi | H04L 67/10 |
| 2018/0368140 | A1 | 12/2018 | Centonza et al. | |
| 2019/0349426 | A1 * | 11/2019 | Smith | H04W 4/08 |
| 2020/0137535 | A1 * | 4/2020 | Hoffner | G06K 9/00791 |
| 2020/0145509 | A1 * | 5/2020 | Slik | H04L 67/2852 |
| 2020/0177589 | A1 * | 6/2020 | Mangalvedkar | H04L 67/12 |
| 2020/0184556 | A1 * | 6/2020 | Cella | G06Q 10/0639 |
| 2020/0310394 | A1 * | 10/2020 | Wouhaybi | H04L 67/125 |
| 2021/0110310 | A1 * | 4/2021 | Guim Bernat | H04L 63/126 |

\* cited by examiner

SELF-LEARNING CONNECTED-DEVICE NETWORK

TECHNICAL FIELD

The subject disclosure relates to wireless communications, e.g., systems and methods that provide a self-learning connected-device network.

BACKGROUND

Internet of things (IoT) technology holds a great promise for the future of the global communications industry. As the number of connected devices that can establish connectivity with other devices and/or passive objects to exchange data continues to rise steadily, the IoT technology gains widespread proliferation in the information technology industry. With an anticipated projection of over 20 billion devices in the next few years, service providers, network providers and/or cloud providers will observe a net increase in their traffic handling capabilities. This can help the providers enable new IoT services tailored to targeted industry verticals.

Typically, connected-device networks are implemented in dynamic environments that change rapidly over time. Log files stored in a cloud capture the final states of the devices (e.g., sensors) at specific instance. However, it can be challenging to keep track of who/what triggered a state change in real time. Complex mathematical models that utilize special skills and extensive human intervention are employed to fine tune and train the log data. This process can be significantly time consuming and inefficient.

The above-described background relating to mobility networks is merely intended to provide a contextual overview of some current issues and is not intended to be exhaustive. Other contextual information may become further apparent upon review of the following detailed description.

DETAILED DESCRIPTION

Figure 1:
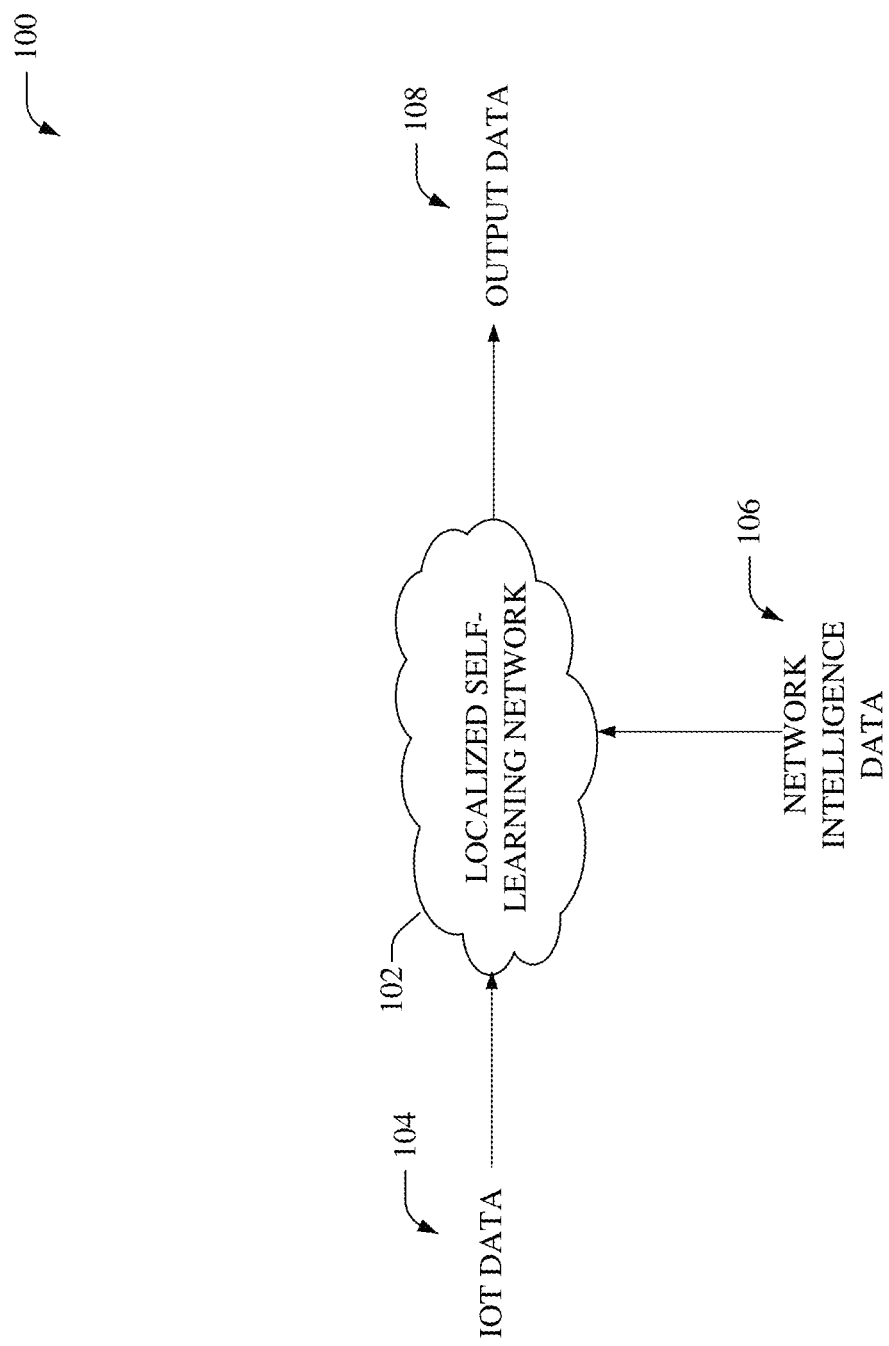
FIG. 1 illustrates an example system that depicts a self-learning network employed to process and/or classify Internet of things (IoT) data.

One or more embodiments are now described with reference to the drawings, wherein like reference numerals are used to refer to like elements throughout. In the following description, for purposes of explanation, numerous specific details are set forth in order to provide a thorough understanding of the various embodiments. It may be evident, however, that the various embodiments can be practiced without these specific details, e.g., without applying to any particular networked environment or standard. In other instances, well-known structures and devices are shown in block diagram form in order to facilitate describing the embodiments in additional detail.

As used in this application, the terms "component," "module," "system," "interface," "node," "platform," "server," "controller," "entity," "element," "gateway," or the like are generally intended to refer to a computer-related entity, either hardware, a combination of hardware and software, software, or software in execution or an entity related to an operational machine with one or more specific functionalities. For example, a component may be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can comprise input/output (I/O) components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement one or more aspects of the disclosed subject matter. An article of manufacture can encompass a computer program accessible from any computer-readable device or computer-readable storage/communications media. For example, computer readable storage media can comprise but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Terms like "user equipment" or similar terminology, refer to a wired or wireless communication-capable device utilized by a subscriber or user of a wired or wireless communication service to receive or convey data, control, voice, video, sound, gaming, or substantially any data-stream or signaling-stream. Data and signaling streams can be packetized or frame-based flows. Further, the terms "user," "subscriber," "consumer," "customer," and the like are employed interchangeably throughout the subject specification, unless context warrants particular distinction(s) among the terms. It should be noted that such terms can refer to human entities or automated components supported through artificial intelligence (e.g., a capacity to make inference based on complex mathematical formalisms), which can provide simulated vision, sound recognition and so forth.

Furthermore, it is noted that the term "cloud" as used herein can refer to a set of servers, communicatively and/or operatively coupled to each other, that host a set of applications utilized for servicing user requests. In general, the cloud computing resources can communicate with user devices via most any wired and/or wireless communication network to provide access to services that are based in the cloud and not stored locally (e.g., on the user device). A typical cloud computing environment can include multiple layers, aggregated together, that interact with each other to provide resources for end-users.

Aspects or features of the disclosed subject matter can be exploited in substantially any wired or wireless communication technology; e.g., universal mobile telecommunications system (UMTS), Wi-Fi, worldwide interoperability for microwave access (WiMAX), general packet radio service (GPRS), enhanced GPRS, third generation partnership project (3GPP) long term evolution (LTE), fifth generation (5G) or other next generation networks, third generation partnership project 2 (3GPP2) ultra mobile broadband (UMB), high speed packet access (HSPA), Zigbee, or another IEEE 802.XX technology, low power wide area (LPWA) and/or non-3GPP standard based solutions, such as, but not limited to, Ingenu, Sigfox, and/or LoRa, etc. Additionally, substantially all aspects of the disclosed subject matter can be exploited in legacy (e.g., wireline) telecommunication technologies.

Internet of things (IoT), which is the future of internet connectivity, enables creation of an information rich ecosystem that can enrich modern connected way of life and transform the way in which businesses as well as consumers function today. Typically, IoT/machine-to-machine (M2M) devices have different characteristics (e.g., communication characteristics, signaling characteristics, operating characteristics, etc.) than regular/commercial user equipment (UEs) (e.g., non-IoT devices, such as, but not limited to, smart phones, tablet computers, personal computers, etc.). For example, the IoT/M2M devices collectively generate a much greater number of signaling connections in the mobile core network as compared to regular UEs. Further, in another example, the service/application provider often performs simultaneous device triggering and monitoring for targeted IoT applications and services. In addition, the IoT/M2M devices operate in a low-power/sleep mode for longer durations (e.g., 99% of the time) as compared to conventional non-IoT devices.

As a variety of IoT device categories emerge based on 3GPP standards evolution supporting a multitude of services, there is an increasing demand on the various network functions within the mobility infrastructure to be more intelligent, dynamic, adaptive, and flexible with their interworking to provide the best possible node level functions and end-to-end service behaviors. The systems and methods disclosed herein can provide a network that continually learns from abstract sensory data (e.g., not just 0s and 1s) and is capable of generating never seen before data (e.g., correlations, patterns, classifications, etc.). Conventional machine learning frameworks utilize explicit programming or pre-defined models/algorithms that are applied to data logs (e.g., representing a final state of sensor data) within a customer cloud. Moreover, these frameworks require customers to store their data logs in the cloud and "train" the data logs by applying different models. For dynamic environments that can change rapidly over time, these models cannot provide real-time tracking data. In contrast, the systems and methods disclosed herein enable network operators (e.g., mobile network operators (MNOs)) to extract important correlations in the sensor data based on network data collected at different time slice and/or locations. In one aspect, underlying relationships in a set of data can be detected as the sensor data transverses the network. Moreover, the network devices can provide logic in different layers to help classify the sensor data early in the process (e.g., instead of waiting for it to reach its final destination). This approach can handle sensor data that is more abstract, like speech processing, cognitive inference, and/or computer vision image segmentation.

Referring initially to FIG. 1, there illustrated is an example system 100 that depicts a self-learning network employed to process and/or classify IoT data, according to one or more aspects of the disclosed subject matter. Typically, system 100 can provide an efficient and fast approach to deliver IoT services, for example, for various IoT applications, such as, but not limited to, connected cars, smart cities, smart manufacturing and/or industrial automation, energy, security, FirstNet, healthcare, etc. In one example, the IoT services can enable operations, such as, but not limited to, monitoring sensor data, creating alerts and/or notifying appropriate personnel, controlling and/or managing tasks (e.g., that can be performed by an IoT device, IoT gateway and/or other connected controller devices), etc.

In an aspect, a localized self-learning network 102 can be utilized to track events (e.g., customized for specific customers) based on IoT data 104. As an example, IoT data 104 can comprise raw sensor data generated by one or more IoT devices. Typically, the IoT devices generate massive amounts of data (e.g., abstract data and/or new data that has not been previously processed) that can be processed in real time by the localized self-learning network 102 to convert it into information, correlations, and/or knowledge which is of interest to customers (e.g., from which customers can gain insights and/or base decisions). This is different from conventional explicit programming or pre-defined models that require customers to transfer their data (e.g., logs representing final sensor states) in a customer cloud and "train" the data by applying the different models. Network operators (e.g., MNOs) have access to large amount of network intelligence data 106 collected at different time slice and locations, which can be utilized to extract important correlations in the sensor data and generate output data 108 in real time. As an example, the network intelligence data 106 can comprise historical data collected during a defined time period and/or within defined geographical regions. Accordingly, the localized self-learning network 102 can determine a localized policy/rule that is appropriate for sensor data collected within a specific area and utilize historically collected network information that is learned and stored within the "layered" network 102 to generate output data 108. In one aspect, the localized self-learning network 102 can comprise multiple layers with pre-defined "object nodes" that can be customized according to a customer's requirements/preferences. As an example, output data 108 can be a classification or category, or an object node of the network 102.

In one aspect, if new data (e.g., belonging to an unknown or new category) is discovered that cannot be classified by the existing object nodes and/or has not been previously classified, the localized self-learning network 102 can dynamically instantiate a new object node with an appropriate "label" or "category" in a secure manner. In one aspect, subsequently received sensor data that has similar characteristics can be directed to the new object node. Further, the localized self-learning network 102 can employ a feedback mechanism to capture adjustments via implicit and/or explicit methods. It is noted that the detection of changes/events/patterns/correlations is in real time rather than in the final state. In one aspect, the output data 108 can be provided to an output engine for generating appropriate alerts and/or tasks.

According to an aspect, system 100 can be integrated with next generation communication networks, for example, a 5G network, as resources can be instantiated dynamically, and wireless sensor data can be captured in real time. However, it is noted that system 100 can also be used in conjunction with the existing traditional cloud networks. As IoT data 104 is captured from the sensors (e.g., wired or wireless), system 100 can be implemented in the cloud without the need to train the data and apply the predefined models to validate the data. Instead, the localized self-learning network 102 of system 100 can automatically generate one or more object nodes that are appropriate for the sensor data in real time as the IoT data 104 is captured and/or received.

Figure 2:
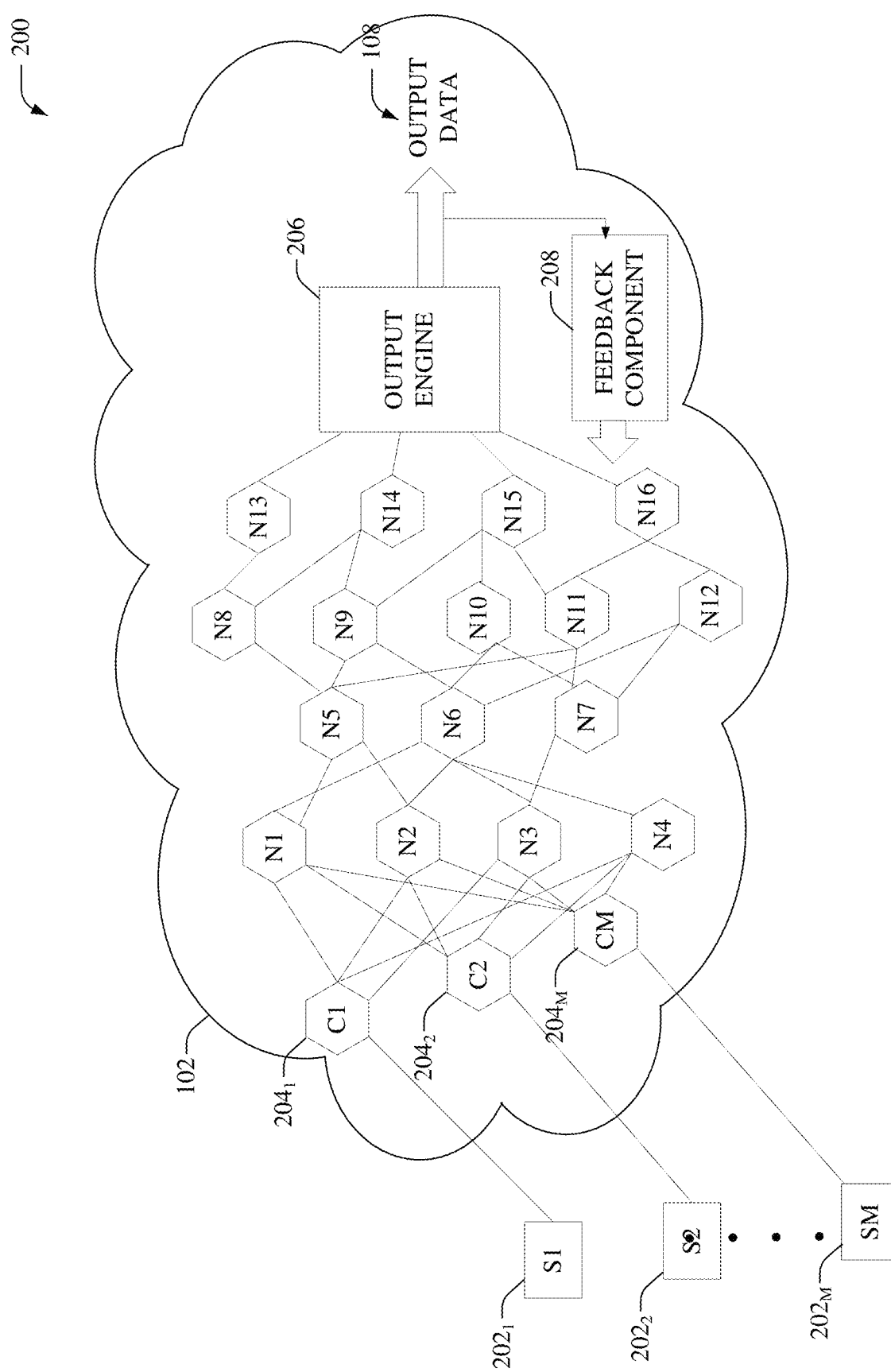
FIG. 2 illustrates an example system that employs a self-learning network to process IoT data.

Referring now to FIG. 2, there illustrated is an example system 200 that employs a self-learning network to process IoT data, in accordance with an aspect of the subject disclosure. System 200 provides an efficient and quick approach to extract intelligence from IoT data and process the extracted intelligence in real time. Moreover, network virtualization techniques can be leveraged to provide a real-time and self-learning network 102 for connected-devices (e.g., IoT devices). Typically, IoT devices (e.g., sensors S1-SM $202_1$-$202_M$; where M is most any integer) can provide abstract data, such as, but not limited to, images and/or video captured by the sensors $202_1$-$202_M$. If a customer wants to verify certain conditions and/or detect specific events (e.g., based on video/image data), conventionally, human intervention is required to review sensed data. Human intervention is performed within the customer's backend cloud network (not shown) and thus, the verification and/or detection process can be extremely time consuming and inefficient. In contrast with the conventional approach, system 200 employs a self-learning network 102 (e.g., front-end network) that can collect, monitor, and classify data provided by the sensors $202_1$-$202_M$ in real time to determine criterion, such as, but not limited to, product trends, traffic forecasts, error conditions, fault detection, alerts, user behavior patterns, etc., which can be provided to the customer. In an aspect, the self-learning network 102 can extract environment data and learn from that, such that, when new data is received (e.g., previously unseen, unclassified, etc.), the network can classify the new data and extract information determined to be of importance for customer. It is noted that the self-learning network 102 can comprise functionality as more fully described herein, for example, as described above with regard to system 100.

According to an embodiment, when an IoT device (e.g., sensors $202_1$-$202_M$) attaches to a wireless network (e.g., self-learning network 102), a service slice can be instantiated for a specific IoT service and/or specific customer, such that appropriate security measures and/or customized features can be implemented within the slice. Collector nodes C1-CM $204_1$-$204_M$ can collect metadata for respective IoT devices (e.g., sensors $202_1$-$202_M$). As an example, the metadata can comprise, but is not limited to speed, time, device location, last session seen, communication protocol used, destination, device states (e.g., power on/idle/power off), etc. In an aspect, a collector node (e.g., C1-CM $204_1$-$204_M$) can create a temporary identifier (ID) for each IoT device to keep track of its metadata collected over time. Further, the collector node (e.g., C1-CM $204_1$-$204_M$) can assign a group identifier (ID) to a group of one or more sensors associated with a business contract. Additional metadata and/or attributes associated with the IoT device (e.g., sensors $202_1$-$202_M$) can be identified (e.g., via C1-CM $204_1$-$204_M$) as the sensor data traverses through one or more different network nodes. In one example, private attributes can be identified, and a security key(s) can be implemented in the collector node to decrypt the received data.

In one aspect, sensor data captured via the IoT device can be stored (e.g., temporarily) within a data store of the self-learning network 102 and values from one or more previous sessions (e.g., associated with the temporary ID and/or group ID), contextual data (e.g. time/location for last network connection), and/or historical data can be utilized (e.g., by one or more network devices) to determine and/or recognize one or more patterns within the sensor data. Additionally, network intelligence data (e.g., monitored and/or collected by the network devices) comprising, but not limited to, normal latency pattern, uplink downlink pattern, system information blocks (SIB) data, session information, historical data collected for a particular device category supported by the network, area specific information, event data, etc., can be utilized for classification and/or determination of patterns.

The sensor data can be further validated using "object nodes" (N1-N16) to fine tune a "labeling" and/or other classification process. As an example, the labeling process can be executed simultaneously (or substantially simultaneously) with multiple object nodes. In an aspect, an object node can be configured to modify its subsequent nodes to create logic and layers that will further identify the features and labels of the sensor data. If a customer-desired output is detected, an output engine 206 can be triggered to alert the results. In one example, the results are exposed through one or more application programming interfaces (APIs) that can be integrated into customer applications. In some example scenarios, the results can be provided back to the IoT devices (e.g., instructions to perform a task, control and/or manage the IoT device, etc.). In other example scenarios, the results can be provided to a network operations support system (OSS) to facilitate outage and/or congestion prevention. Additionally, a feedback component 208 can utilize the output data 108 to improve (e.g., increase classification accuracy) the object nodes N1-N16. Moreover, optimization is performed within the network without communicating with the Internet for training/testing. It is noted that although system 200 depicts sixteen object nodes, the subject specification is not that limited and the self-learning network 102 can comprise fewer or greater number of object nodes.

Figure 3:
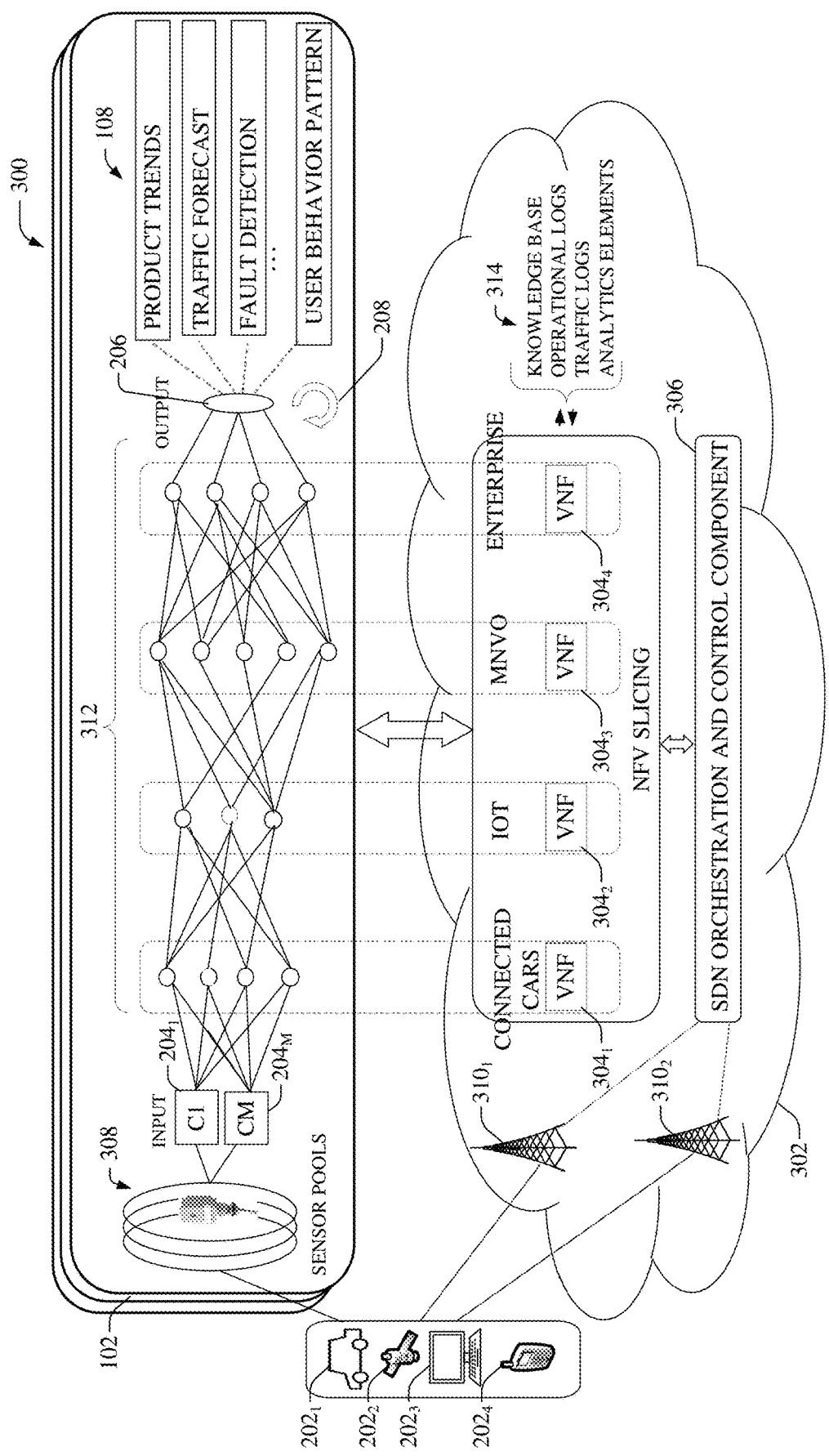
FIG. 3 illustrates an example system that comprises a fifth generation (5G) network cloud learning system.

Referring now to FIG. 3, there illustrated is an example system 300 that comprises a 5G network cloud learning system, in accordance with an aspect of the subject disclosure. In this embodiment, the self-learning network 102 can be built on cloud technology that is based on network functions virtualization (NFV) and/or software-defined networking (SDN). NFV can virtualize network services that have been conventionally carried out by proprietary, dedicated hardware/software and instead host the network services on one or more virtual machines (VMs). Using NFV, network service providers do not need to purchase proprietary/dedicated hardware devices to enable a service. NFV can improve scalability and flexibility and network capacity can easily be adjusted through software, resulting in reduced capital expenses and/or operating expenses. NFV and SDN are different technologies but complementary. SDN architectures decouple or disassociate network control (e.g., control plane) and forwarding (e.g., data plane) functions. This allows for dynamic, programmable, and/or scalable computing and storage. The SDN architecture can be at least (i) directly programmable; (ii) agile; (iii) centrally managed; (iv) programmatically configured; and/or (v) open standards-based and vendor-neutral.

In one example, the mobility network 302 of system 300 can comprise 5G and/or other next generation networks that provide enhanced mobile broadband. In one aspect, the network functions that will serve 5G and/or other next-generation technologies (e.g., network 302) can be "sliced" and be instantiated in any suitable edge office locations, besides central offices, on demand. Network slicing can transform a monolithic mobility networking architecture that has traditionally been used to service smartphones in the current wireless network provider industry. Generally, a slice (e.g., virtualized network functions (VNFs) $304_1$-$304_4$) can be a virtualization of a physical network that enables independent architecture, partitioning, and organization of computing resources in each slice. Moreover, network slices are a specific form of virtualization that allow multiple logical networks to run on top of a shared physical network infrastructure. This can facilitate flexibility that is typically not readily available in a monolithic embodiment of a physical network. Network slicing can create logically separate slices of the core network entities running on common mobility infrastructure, wherein each slice can provide customized connectivity for a service (and/or class of service). Typically, a slice, e.g., VNFs $304_1$-$304_4$, can be considered self-contained with regard to operation, traffic flow, performance, etc., and can have its own virtualized architecture and features, and can be individually provisioned in a network. The virtualization of physical network resources via slicing can simplify creation, management, and operation of slices, typically tailored to a type of functionality, environment, service, hardware, etc., to enable efficient consumption of network resources of the physical network. An SDN orchestration and control component 306 can manage and coordinate the NVF slicing.

Sensors of IoT devices (e.g., $202_1$-$202_4$) can feed sensor data (e.g., audio data, images, videos, etc.) to a localized self-learning network 102 for dynamic intelligent advice or action. In one example, the IoT devices (e.g., $202_1$-$202_4$) can provide the data directly to the collector nodes ($204_1$-$204_M$), via sensor pools 308. In another example, the IoT devices (e.g., $202_1$-$202_4$) can provide the data via one or more access point devices (e.g., $310_1$-$310_2$) of network 302. Moreover, the IoT devices (e.g., $202_1$-$202_4$) can comprise most any connected device, such as, but not limited to, most any LTE-based appliance, machine, device, security system, home automation system, satellite systems, automated vehicle and/or at least partially automated vehicle (e.g., drones), etc. Further, the IoT devices (e.g., $202_1$-$202_4$) can comprise one or more sensors and/or a radio-frequency identification (RFID) reader and can be typically employed for automated data transmission and/or measurement between mechanical and/or electronic devices. As discussed in detail with respect to system 200, the self-learning network 102 can configure multiple layers of object nodes 312 (e.g., N1-N16) to determine output data that can be of interest to a customer (e.g., likelihood of the output data being of interest to the customer satisfies a defined criterion).

Additionally, taking the advantage of slicing models, an internal learning network layer or sub-network can leverage network information 314, such as, but not limited to, knowledge base, operational logs, traffic logs, analytics elements, previously collected information/historical data, application patterns, etc., created on VNF slices for a deeper analysis and learning on a more focused area and/or category, for example, type of device (e.g., connected car category, IoT category, mobile virtual network operator (MVNO) category, enterprise category, etc.). New VNFs can be dynamically instantiated based on learning indications (e.g., determined by the output engine 206 the self-learning network 102). In one aspect, system 300 can comprise a hierarchy of self-learning networks 102, wherein training for each self-learning network can be conducted recursively, forward and/or backward propagating. Further, outputs from each self-learning network can also be fed to the next learning network or a sub-network (e.g., network 302). Cycles of training can bring the network to a smarter level. Furthermore, the sub-network (e.g., network 302) can share learning information between slices (e.g., VNFs $304_1$-$304_4$). It is noted that although learning information (e.g., data that can be employed to facilitate faster and/or accurate classification and/or event detection) is shared between slices, private data and/or customer data is not be shared. Accordingly, the system 300 can be a multi layer learning system, wherein each learning layer can be vertical and horizontal. For example, if detected that the IoT device belongs to a defined type of device category, the output data 108 can be directed to a specific slice of network 302 for further analysis using network information 314.

Figure 4:
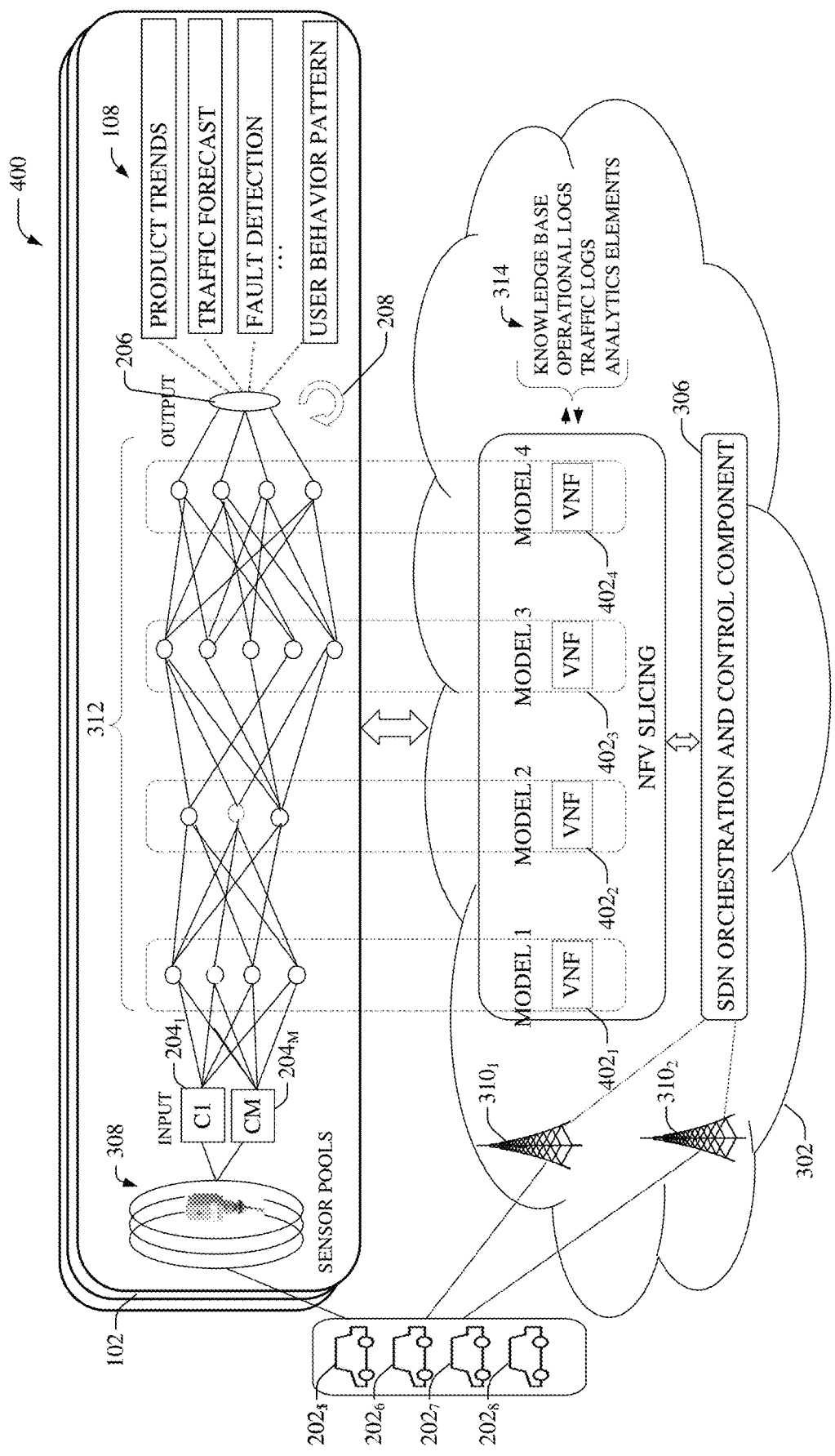
FIG. 4 illustrates an example system comprising a sub-network of a self-learning network.

Referring now to FIG. 4, there illustrated is an example system 400 comprising an example sub-network of a self-learning network, according to an aspect of the subject disclosure. Moreover, the sub-network can facilitate vendor/customer-specific network slicing. In this example embodiment, the IoT devices (e.g., $202_5$-$202_8$) can belong to the same device category, for example, connected cars, and the sub-network 302 can instantiate slices (e.g., VNFs $402_1$-$402_4$) that are customized for the make, model, and/or manufacturer of the device. For example, VNF $402_1$ can be instantiated to process data associated with connected cars of Car original equipment manufacturer (OEM) #1, VNF 4022 can be instantiated to process data associated with connected cars of Car OEM #2, VNF $402_3$ can be instantiated to process data associated with connected cars of Car OEM #3, and VNF $402_4$ can be instantiated to process data associated with connected cars of Car OEM #4. It is noted that although system 400 depicts only four VNFs, a fewer or greater number of VNFs can be implemented. In one aspect, if the self-learning network 102 detect that a connected car that does not belong to a make, model, variant, and/or manufacturer associated with the instantiated VNFs $402_1$-$402_4$, a new VNF can be dynamically instantiated for the new make, model, variant, and/or manufacturer and data received from connected cars of the new make, model, variant, and/or manufacturer can be directed to and/or processed via the new VNF.

Figure 5:
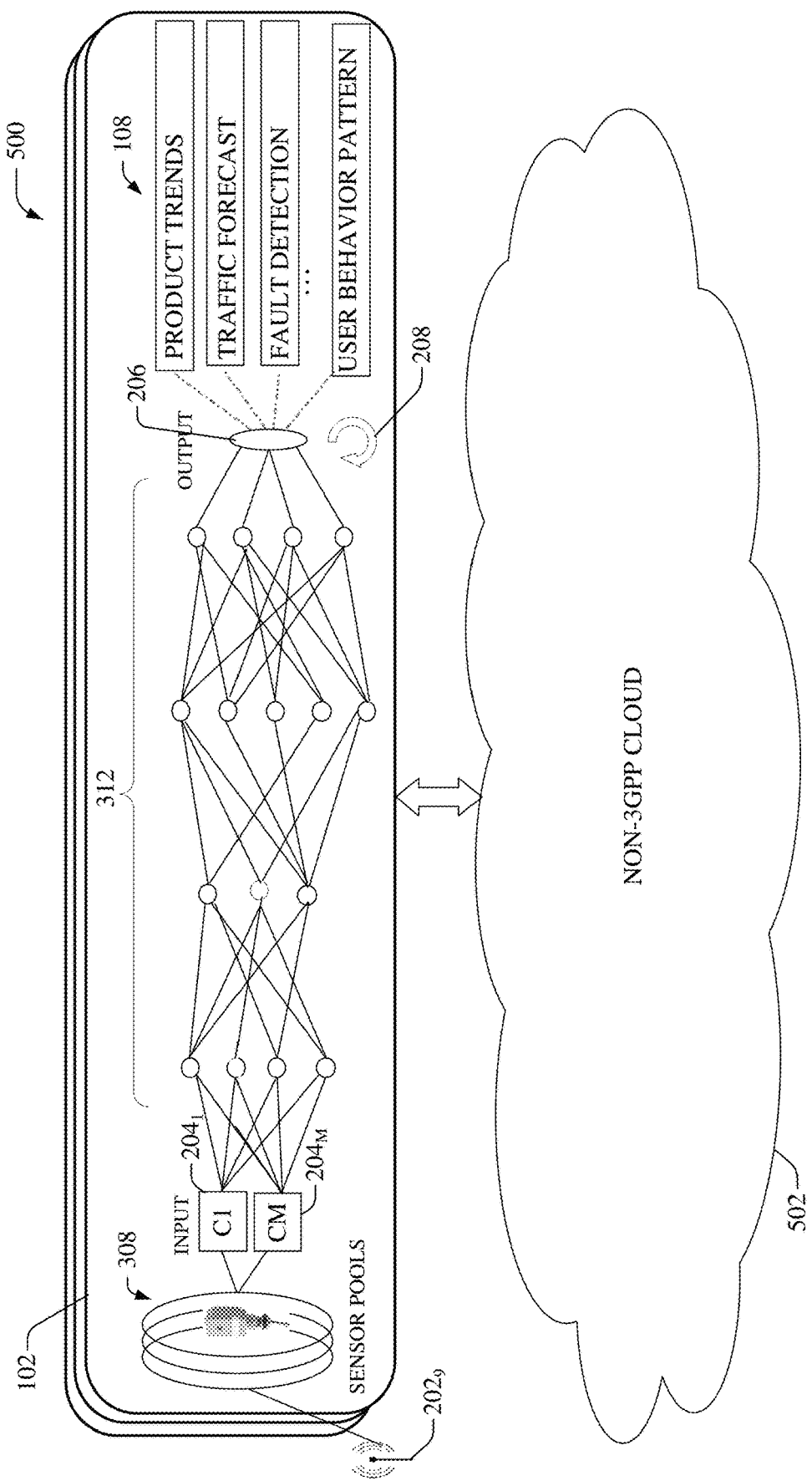
FIG. 5 illustrates an example system that provides a self-learning network that is integrated with a non-3GPP network.

FIG. 5 illustrates an example system 500 that provides a self-learning network integrated with a non-3GPP network, according to an aspect of the subject disclosure. As an example, the non-3GPP cloud 502 can comprise most any public cloud network. In one aspect, devices of the non-3GPP cloud 502 can further process output data 108 to extract information that is likely to be of interest to the customer (e.g., events, errors, failures, abnormal and/or irregular behavior, etc.).

Figure 6:
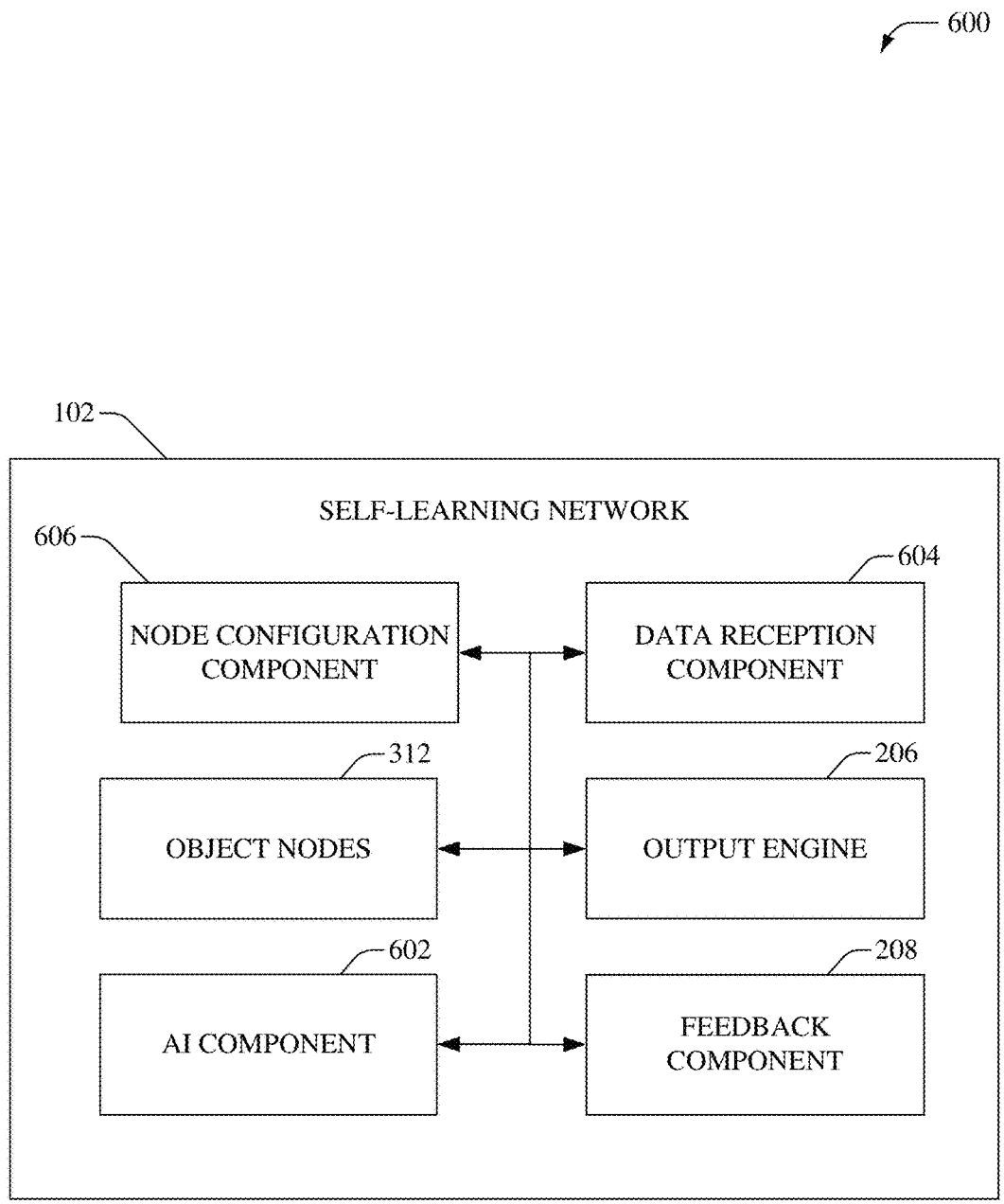
FIG. 6 illustrates an example system that facilitates automating one or more features in accordance with the subject embodiments.

Referring now to FIG. 6, there illustrated is an example system 600 that employs an artificial intelligence (AI) component (602) to facilitate automating one or more features in accordance with the subject embodiments. It can be noted that the self-learning network 102, output engine 206, and feedback component 208 can comprise functionality as more fully described herein, for example, as described above with regard to systems 100-500. In one aspect, data reception component 604 (e.g., comprising collector nodes) can obtain information, such as, but not limited to, sensor data, metadata associated with IoT device, network intelligence data, etc. Based on an analysis of the information, a node configuration component 606 can configure object nodes 312 that facilitate classification of the sensor data to extract information that is likely to be of interest and/or value to a customer.

In an example embodiment, system 600 (e.g., in connection with data extraction) can employ various AI-based schemes (e.g., intelligent processing/analysis, machine learning, etc.) for carrying out various aspects thereof. For example, a process for analyzing sensor data can be facilitated via an automatic classifier system implemented by AI component 602. Moreover, the AI component 602 can exploit various artificial intelligence (AI) methods or machine learning methods. Artificial intelligence techniques can typically apply advanced mathematical analysis—e.g., decision trees, neural networks, regression analysis, principal component analysis (PCA) for feature and pattern extraction, cluster analysis, genetic algorithm, or reinforced learning—to a data set. In particular, AI component 602 can employ one of numerous methodologies for learning from data and then drawing inferences from the models so constructed. For example, hidden markov models (HMMs) and related prototypical dependency models can be employed. General probabilistic graphical models, such as Dempster-Shafer networks and Bayesian networks like those created by structure search using a Bayesian model score or approximation can also be utilized. In addition, linear classifiers, such as support vector machines (SVMs), non-linear classifiers like methods referred to as "neural network" methodologies, fuzzy logic methodologies can also be employed.

As will be readily appreciated from the subject specification, an example embodiment can employ classifiers that are explicitly trained (e.g., via a generic training data) as well as implicitly trained (e.g., via observing device/operator preferences, historical information, receiving extrinsic information, type of service, type of device, etc.). For example, SVMs can be configured via a learning or training phase within a classifier constructor and feature selection module. Thus, the classifier(s) of AI component 602 can be used to automatically learn and perform a number of functions, comprising but not limited to determining according to a predetermined criteria, when and which actions are to be performed (e.g., controlling functions of one or more IoT devices), notifications provided to a customer, determining information that is likely to be of interest to the customer, changes in patterns, trends, and/or device/user behavior, etc. The criteria can comprise, but is not limited to, historical patterns and/or trends, network operator preferences and/or policies, customer preferences, predicted traffic flows, event data, latency data, reliability/availability data, current time/date, sensor data, weather data, type of IoT device, news, and the like.

Figure 7:
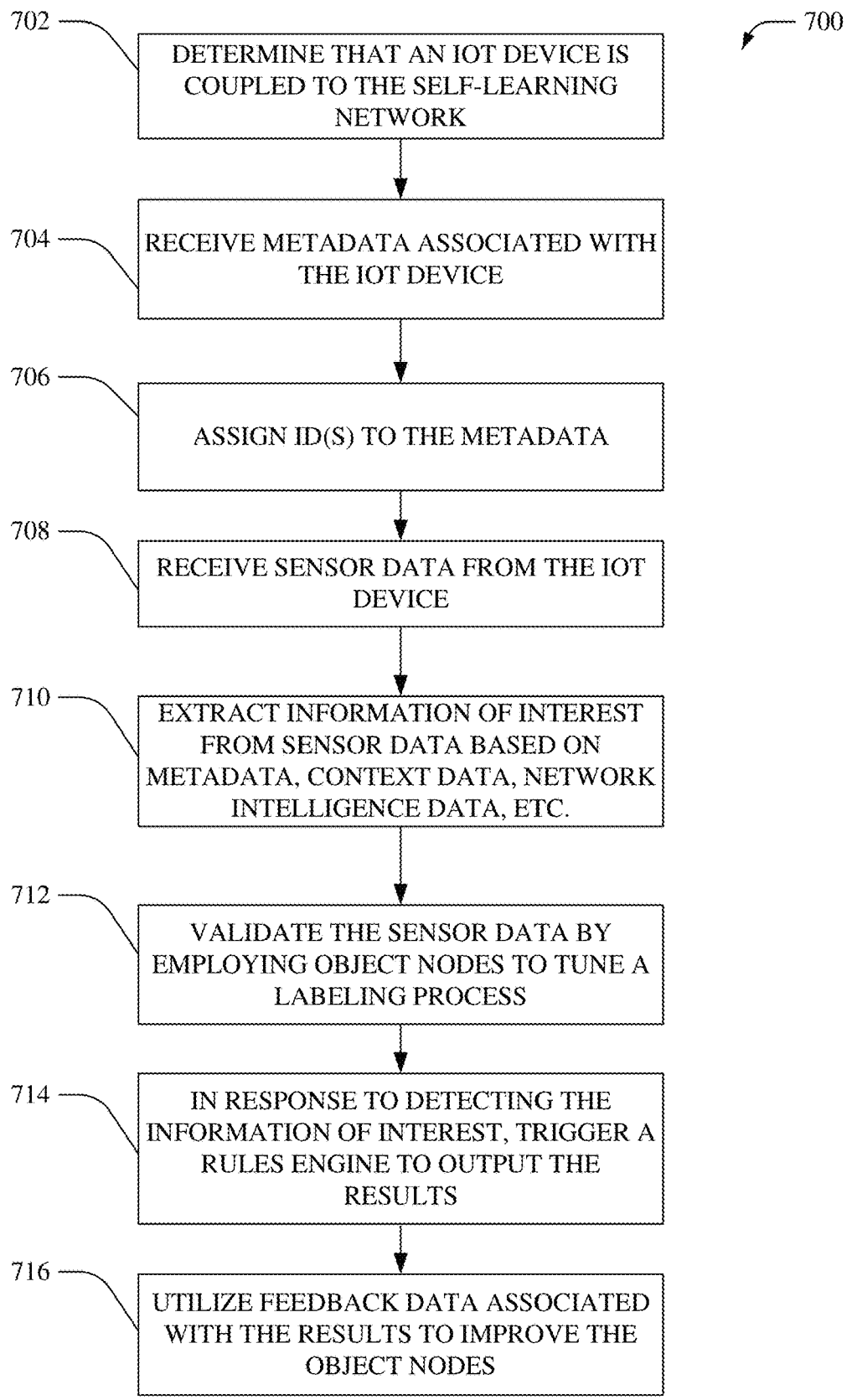
FIG. 7 illustrates an example method that provides a real-time and self-learning connected-device network.
Figure 8:
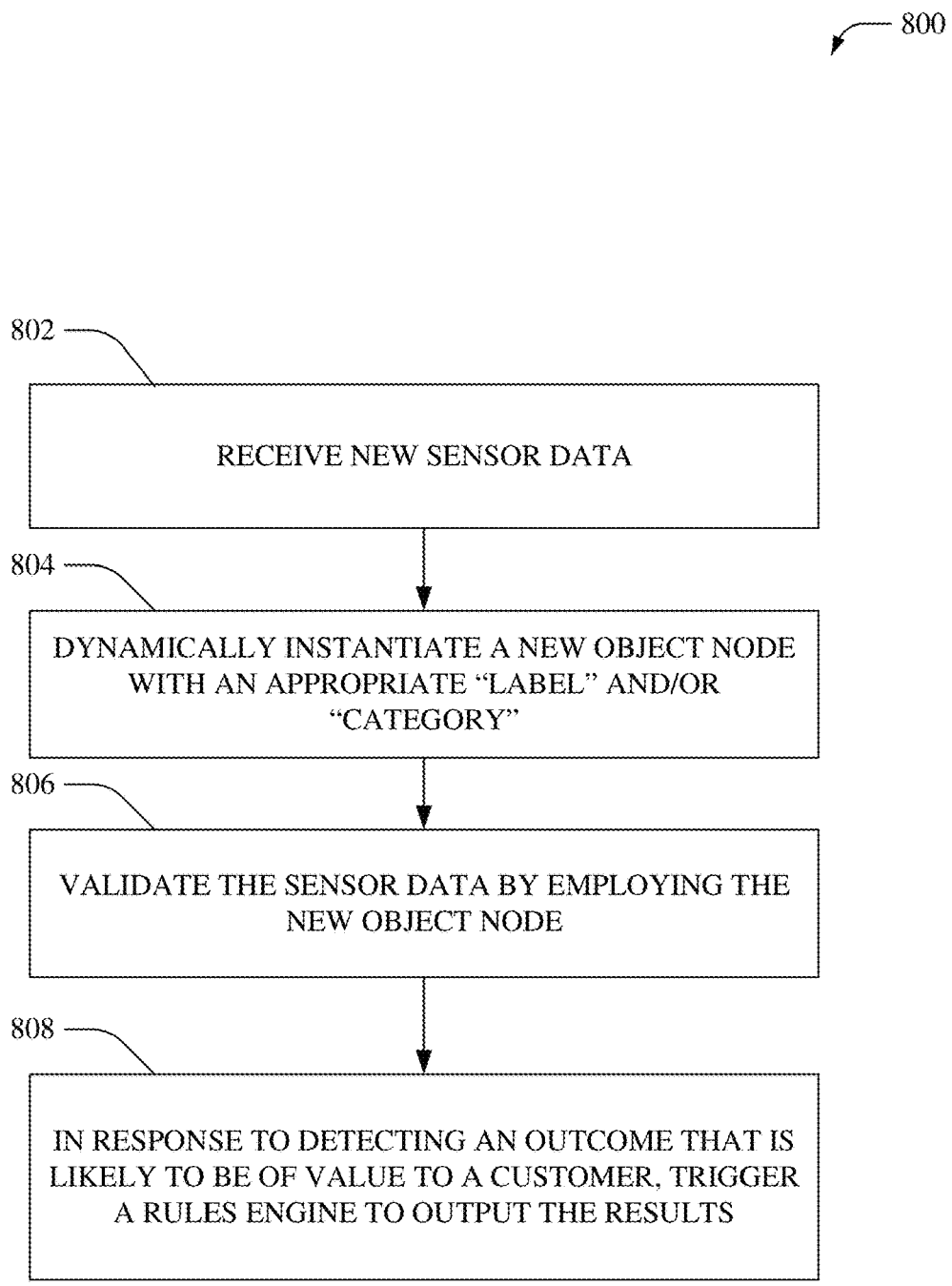
FIG. 8 illustrates an example method for real-time classification of new sensor data via a self-learning network.

FIGS. 7-8 illustrate flow diagrams and/or methods in accordance with the disclosed subject matter. For simplicity of explanation, the flow diagrams and/or methods are depicted and described as a series of acts. It is to be understood and noted that the various embodiments are not limited by the acts illustrated and/or by the order of acts, for example acts can occur in various orders and/or concurrently, and with other acts not presented and described herein. Furthermore, not all illustrated acts may be required to implement the flow diagrams and/or methods in accordance with the disclosed subject matter. In addition, those skilled in the art will understand and note that the methods could alternatively be represented as a series of interrelated states via a state diagram or events. Additionally, it should be further noted that the methods disclosed hereinafter and throughout this specification are capable of being stored on an article of manufacture to facilitate transporting and transferring such methods to computers. The term article of manufacture, as used herein, is intended to encompass a computer program accessible from any computer-readable device or computer-readable storage/communications media.

Referring now to FIG. 7 there illustrated is an example method 700 that provides a real-time and self-learning connected-device network, according to an aspect of the subject disclosure. In an aspect, method 700 can be implemented by one or more network devices of a communication network (e.g., mobility network). Method 700 provides an efficient and/or low-latency approach to extract intelligence (e.g., information likely to be desired by a customer, likely to be of interest to a customer, etc.) from received IoT data and be able to process it in real time. Accordingly, the customer does not have to wait until the very end, when IoT data is in the customer cloud to process it and detect events.

At 702, it can be determined that an IoT device is coupled to the self-learning network (e.g., via a mobility network access point and/or sensor pool devices). At 704, metadata associated with the IoT device can be received. As an example, the metadata can comprise information such as, but not limited to, device speed, time, device location, last session seen, communication protocol used, destination, device states, and/or any other attributes that can be received as the IoT device moves through different access networks (e.g., of the mobility network). The metadata can be stored within a data store of the self-learning network and at 706, IDs can be assigned to the metadata. For example, the IDs can comprise a device ID specific to the IoT device and/or a group ID for a group of devices associated with a specific customer account/business contract. In one aspect, the metadata can comprise private attributes that can be decrypted based on one or more security keys implemented in a node (e.g., collector node) of the self-learning network.

At 708, sensor data can be received from the IoT device. As an example, sensor data can comprise content (e.g., images, video, audio, and/or measurements) captured by the IoT device. Moreover, the sensor data can be abstract, for example, not just 0s and 1s. At 710, information of interest (e.g., explicitly request by a customer and/or predicted to be of interest to a customer) can be extracted from the sensor data based on an analysis of the metadata, context data (e.g., location, weather, news, time, etc.), network intelligence data (e.g., observed/learned by network devices over time), etc. Further, the sensor data is validated by employing object nodes to tune a labeling process. As an example, the object nodes can be pre-defined for a customer and/or dynamically instantiated based on the sensor data. Typically, the object nodes can be layered, such that object nodes in a subsequent layer further classify the sensor data (e.g., like peeling layers) to finally arrive at final classification (e.g., most accurate prediction). For example, in a shipping application, based on images/videos of ships, the self-learning network can determine information, such as, but not limited to, whether the ship is a trade ship, the features of the cargo, any trade violations, etc. Accordingly, the network devices in the front-end can perform the determination/classification and provide results to a customer. Moreover, determination/classification is performed in real time as sensor data is received rather than in a final state (e.g., logs stored in customer cloud).

At 714, in response to detecting the information of interest (e.g., final classification), a rules engine can be triggered. In one aspect, the rules engine can apply pre-defined (e.g., by the customer and/or network operator) and/or dynamically-determined policies to further process and/or the information. For example, final classification results can be exposed through APIs that are integrated into the customer applications. In one aspect, the final classification results can trigger tasks that are to be performed, for example, by the IoT device and/or other devices. For example, the sensor data can comprise images of limestone rocks within a quarry, the self-learning network can determine that calcium content of the rocks is at a certain level, and accordingly, a rules engine can instruct a driver (e.g., via an application) to collect the specified rocks. In another example, the final classification results can provide results to OSS system to prevent outage/congestion in specific areas and/or during specific events/time periods. At 716, feedback data (e.g., received customer/user interaction) associated with the results can be utilized to improve the classification and/or labeling process of one or more object nodes. Accordingly, the classification and/or labeling process is optimized within the front-end network independent of accessing the Internet for training/testing.

FIG. 8 illustrates an example method 800 for real-time classification of new sensor data via a self-learning network, according to an aspect of the subject disclosure. As an example, method 800 can be implemented one or more network devices of a communication network (e.g., cellular network). To recognize underlying relationships in a set of sensor data, the self-learning network can help break down from a complicated question—e.g. does this sensor data contains important information that the customer is looking for—into very simple questions at different layer of the network by employing layers of object nodes and traversing the sensor data through a set of the object nodes.

At 802, new sensor data can be received. As an example, "new" sensor data can comprise information and/or categories that have previously not been encountered/classified by the network. On receiving such sensor data, at 804, a new object node with an appropriate/new "label" and/or "category" can be dynamically instantiated (e.g., via node configuration component 606). Additionally or optionally, sub-network can dynamically instantiate new slices (e.g., vendor-specific, device-specific, industry-specific, etc.). At 806, the sensor data can be validated by employing the new object node. Further, at 808, in response to detecting an outcome that is likely to be of value to a customer, a rules engine can be triggered to output the results (e.g., notify the customer, perform defined tasks, instruct defined devices, etc.)

Aspects and embodiments disclosed herein can be implemented in next generation networks, for example, 5G networks. 5G are configured to provide enhanced mobile broadband, for example, ultra high bandwidth (e.g., 20 Gbps), high spectral efficiency (e.g., 3.5× of LTE), ultra dense networks, and/or energy efficiency. Further, the 5G networks can provide ultra-reliable (e.g., high reliability greater than 99.999%) and low latency communications (e.g., ultra low latency of ~1 msec and/or low network access and synchronization time). Furthermore, the 5G networks can facilitate massive machine type communication (e.g., ultra high density ($10^6$/sq km), long battery life (10 years+), high system gain (better than narrow band-IoT and/or more efficient than narrow band-IoT).

Figure 9:
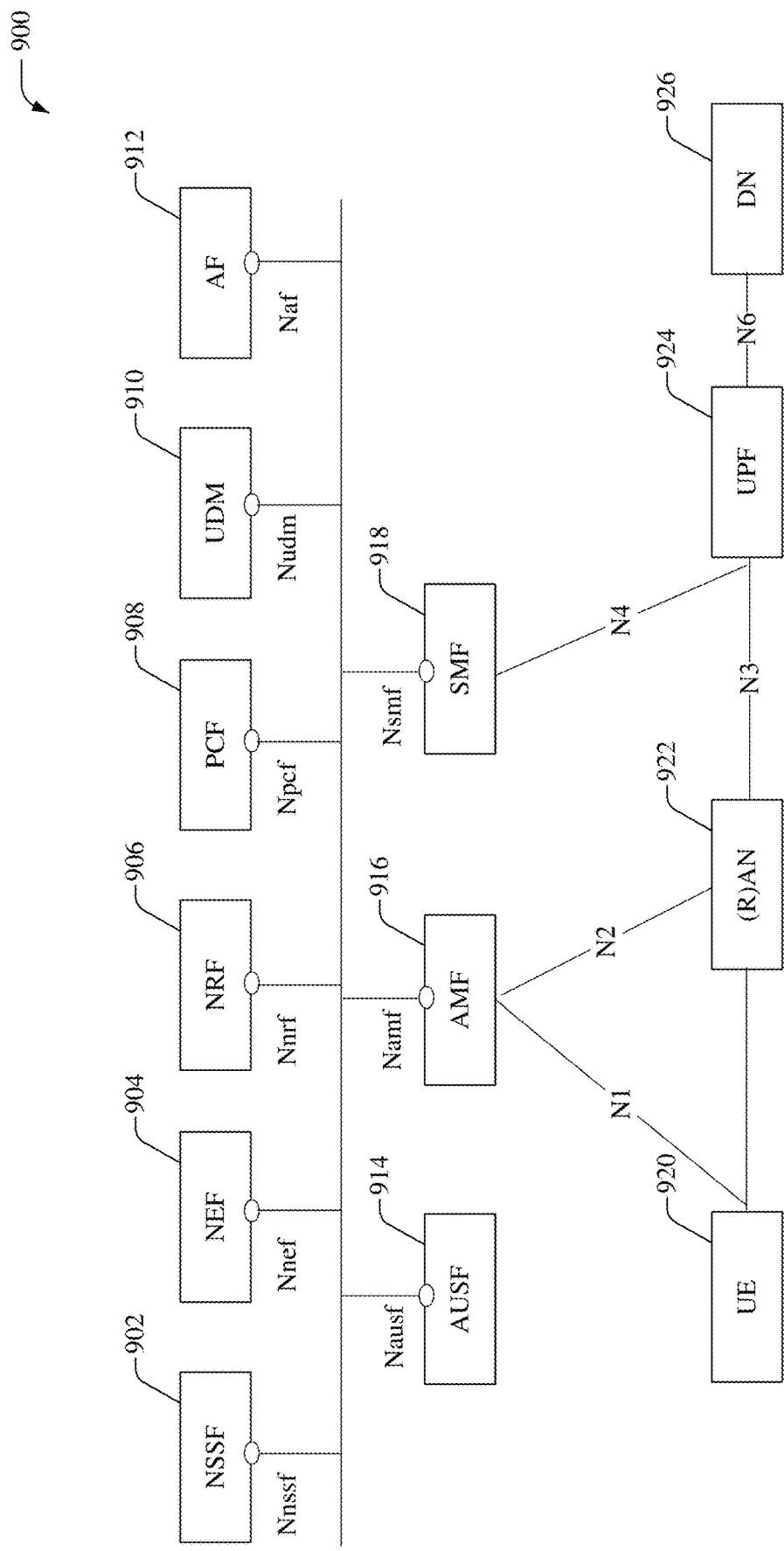
FIG. 9 illustrates an example system that depicts a service-based 5G network architecture.
Figure 10:
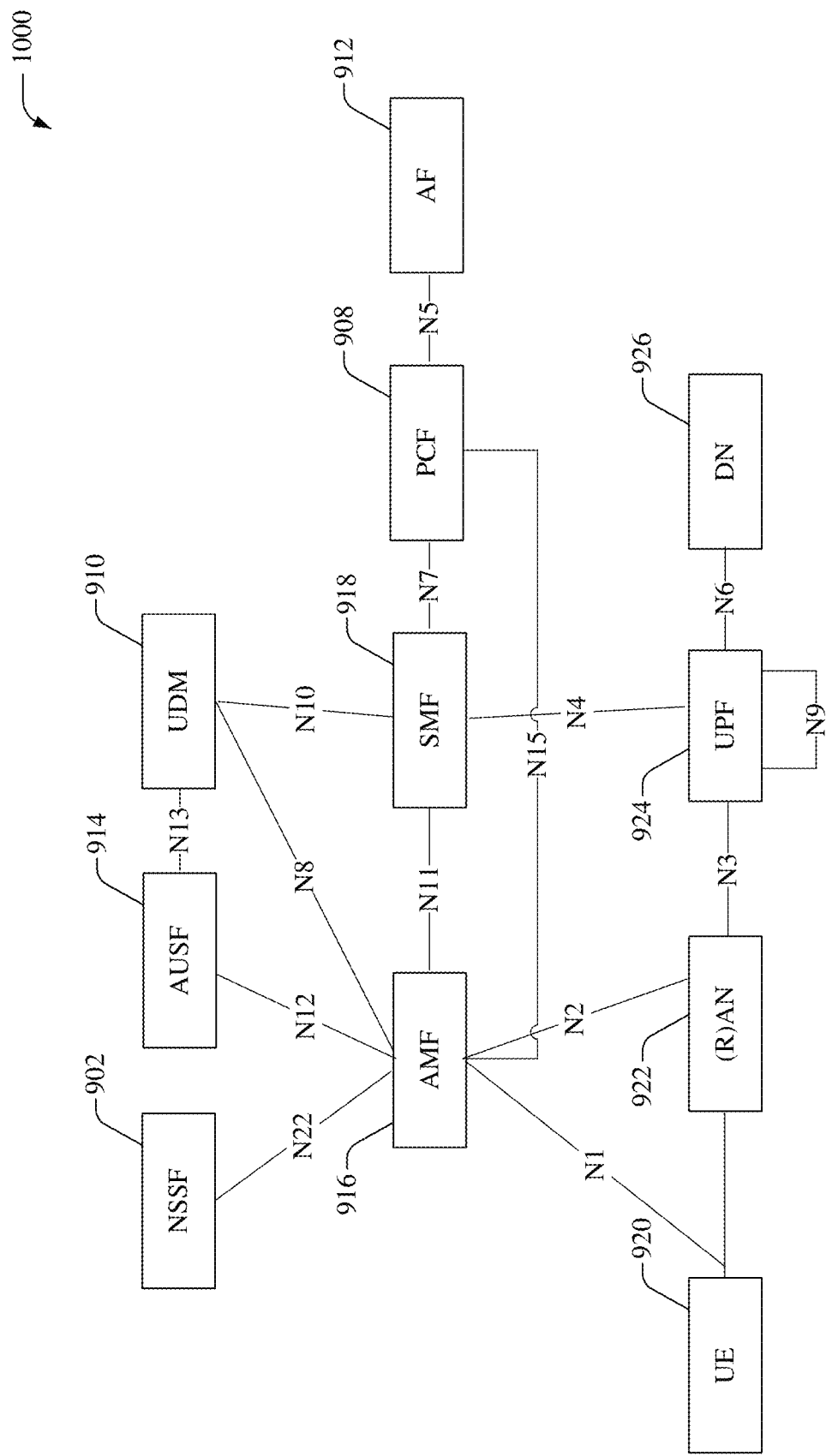
FIG. 10 illustrates an example system that depicts a non-roaming 5G system architecture in reference point representation.

The 5G network architecture is defined as service-based and the interaction between network functions can be represented as shown in FIGS. 9-10. FIG. 9 illustrates an example system 900 that depicts a service-based network architecture, according to an aspect of the subject disclosure. In an aspect, system 900 depicts service-based interfaces being used within the control plane. For example, one network function (e.g. AMF 916) within the control plane can allows other NFs (e.g., NSSF 902, NEF 904, NRF 906, PCF, 908, UDM 910, AF 912, AUSF 914, SMF 918, UPF 924, etc.) that have been authorized, to access its services. This representation also includes point-to-point reference points between the NFs where necessary (e.g., between AMF 916 and UE, 920/(R)AN 922, SMF 918 and UPF 924, (R)AN 922 and UPF 924, UPF 924 and data network (DN) 926).

In an aspect, the AMF 916 can support termination of non-access stratum (NAS) signaling, NAS ciphering and integrity protection, registration management, connection management, mobility management, access authentication and authorization, security context management, etc. The SMF 918 can support session management (e.g., session establishment, modification, release, etc.), UE IP address allocation and management, dynamic host configuration protocol (DHCP) functions, termination of NAS signaling related to session management, downlink (DL) data notification, traffic steering configuration for UPF 924 for proper traffic routing, etc. Further, the UPF 924 can support packet routing and forwarding, packet inspection, QoS handling, can act as external protocol data unit (PDU) session point of interconnect to DN 926, and can be anchor point for intra- and inter-radio access technology (RAT) mobility. A PCF 908 can support unified policy framework, provide policy rules to control plane functions, access subscription information for policy decisions in a unified data repository (UDR), etc. Additionally, the AUSF 914 can comprise an authentication server that authenticates UE 920.

In an aspect, the UDM 910 can support generation of authentication and key agreement (AKA) credentials, user identification handling, access authorization, subscription management, etc. The AF 912 can support application influence on traffic routing, accessing NEF 904, interaction with policy framework for policy control, etc. Further, the NEF 904 can support exposure of capabilities and events, secure provision of information from external application to 3GPP network, translation of internal/external information, etc. Furthermore, the NRF 906 can support service discovery function, maintains NF profile and available NF instances, etc. According to an embodiment, the NSSF 902 can support selecting of the network slice instances to serve the UE 920 that registers via (radio) access network ((R)AN) 922, determining the allowed network slice selection assistance information (NSSAI), determining the AMF (e.g., AMF 916) set to be used to serve the UE, etc.

FIG. 10 illustrates an example system 1000 that depicts a non-roaming 5G system architecture in reference point representation, according to an aspect of the subject disclosure. In one aspect, system 1000 focuses on the interactions between pairs of network functions defined by point-to-point reference point (e.g. N7) between any two network functions. This kind of representation is used when some interaction exists between any two network functions. It is noted that NSSF 902, PCF, 908, UDM 910, AF 912, AUSF 914, AMF 916, SMF 918, UE 920, (R)AN 922, UPF 924, and DN 926, can comprise functionality as more fully described herein, for example, as described above with regard to system 900. It should be noted that although various aspects and embodiments have been described herein in the context of 5G networks, the disclosed aspects are not limited to 5G technology and can be applied to other future wireless communication technologies and their evolutions.

Figure 11:
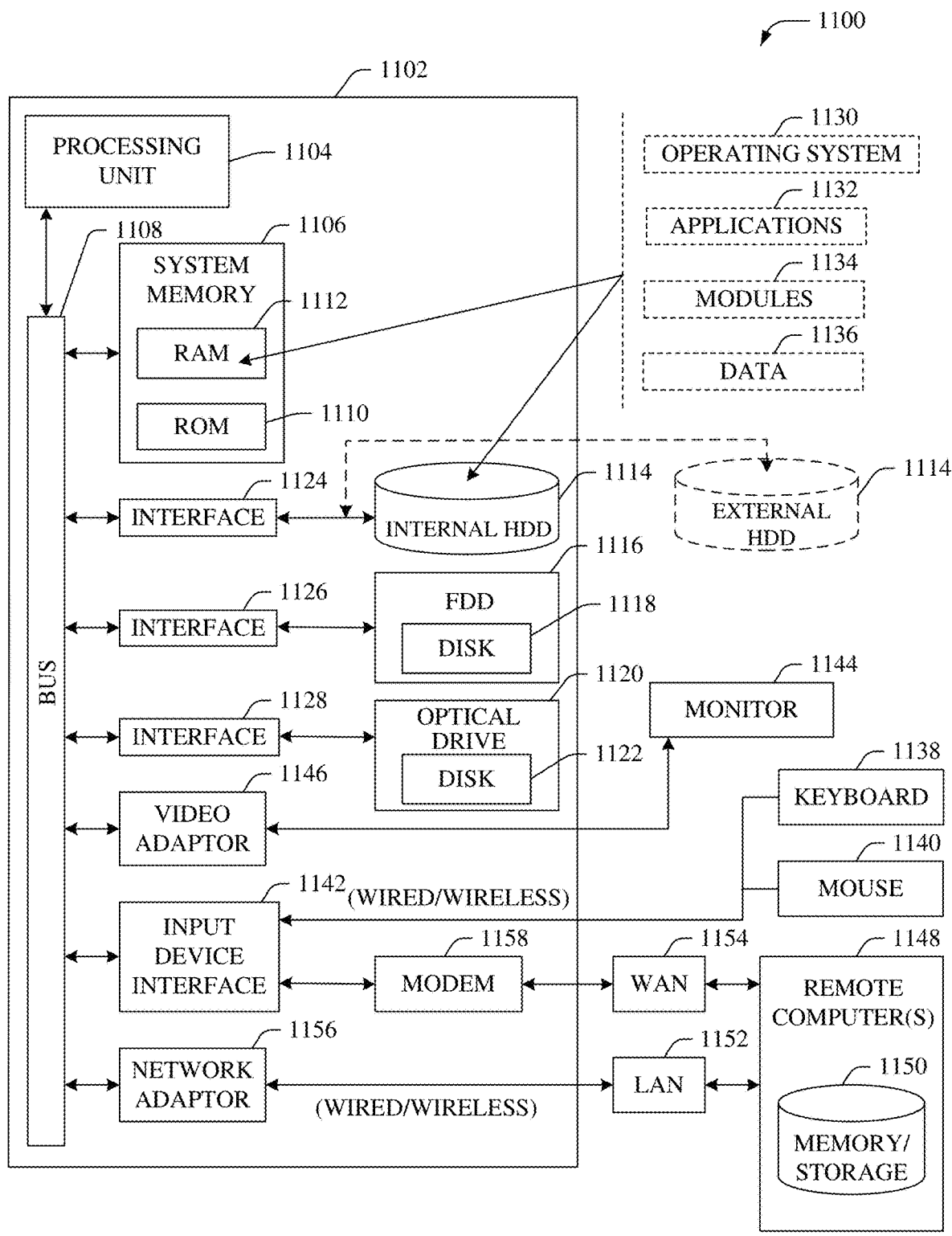
FIG. 11 illustrates a block diagram of a computer operable to execute the disclosed communication architecture.

Referring now to FIG. 11, there is illustrated a block diagram of a computer 1102 operable to execute the disclosed communication architecture. In order to provide additional context for various aspects of the disclosed subject matter, FIG. 11 and the following discussion are intended to provide a brief, general description of a suitable computing environment 1100 in which the various aspects of the specification can be implemented. While the specification has been described above in the general context of computer-executable instructions that can run on one or more computers, those skilled in the art will recognize that the specification also can be implemented in combination with other program modules and/or as a combination of hardware and software.

Generally, program modules comprise routines, programs, components, data structures, etc., that perform particular tasks or implement particular abstract data types. Moreover, those skilled in the art will note that the inventive methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification can also be practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, radio frequency (RF), infrared and other wireless media.

With reference again to FIG. 11, the example environment 1100 for implementing various aspects of the specification comprises a computer 1102, the computer 1102 comprising a processing unit 1104, a system memory 1106 and a system bus 1108. As an example, the component(s), network(s), application(s) server(s), equipment, system(s), interface(s), gateway(s), controller(s), node(s), engine(s), entity(ies), function(s), center(s), point(s) and/or device(s) (e.g., self-learning network 102, IoT devices (e.g., $202_1$-$202_M$), collector nodes $204_1$-$204_M$, output engine 206, feedback component 208, network 302, SDN orchestration and control component 306, sensor pools 308, access point devices $310_1$-$310_2$, object nodes 312, non-3GPP cloud 502, AI component 602, data reception component 604, node configuration component 606, NSSF 902, NEF 904, NRF 906, PCF, 908, UDM 910, AF 912, AUSF 914, AMF 916, SMF 918, UE 920, (R)AN 922, UPF 924, and DN 926, etc.) disclosed herein with respect to systems 100-600 and 900-1000 can each comprise at least a portion of the computer 1102. The system bus 1108 couples system components comprising, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 comprises read-only memory (ROM) 1110 and random access memory (RAM) 1112. A basic input/output system (BIOS) is stored in a non-volatile memory 1110 such as ROM, EPROM, EEPROM, which BIOS contains the basic routines that help to transfer information between elements within the computer 1102, such as during startup. The RAM 1112 can also comprise a high-speed RAM such as static RAM for caching data.

The computer 1102 further comprises an internal hard disk drive (HDD) 1114, which internal hard disk drive 1114 can also be configured for external use in a suitable chassis (not shown), a magnetic floppy disk drive (FDD) 1116, (e.g., to read from or write to a removable diskette 1118) and an optical disk drive 1120, (e.g., reading a CD-ROM disk 1122 or, to read from or write to other high capacity optical media such as the DVD). The hard disk drive 1114, magnetic disk drive 1116 and optical disk drive 1120 can be connected to the system bus 1108 by a hard disk drive interface 1124, a magnetic disk drive interface 1126 and an optical drive interface 1128, respectively. The interface 1124 for external drive implementations comprises at least one or both of Universal Serial Bus (USB) and IEEE 1394 interface technologies. Other external drive connection technologies are within contemplation of the subject disclosure.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to a HDD, a removable magnetic diskette, and a removable optical media such as a CD or DVD, it should be noted by those skilled in the art that other types of storage media which are readable by a computer, such as zip drives, magnetic cassettes, flash memory cards, solid-state disks (SSD), cartridges, and the like, can also be used in the example operating environment, and further, that any such storage media can contain computer-executable instructions for performing the methods of the specification.

A number of program modules can be stored in the drives and RAM 1112, comprising an operating system 1130, one or more application programs 1132, other program modules 1134 and program data 1136. All or portions of the operating system, applications, modules, and/or data can also be cached in the RAM 1112. It is noted that the specification can be implemented with various commercially available operating systems or combinations of operating systems.

A user can enter commands and information into the computer 1102 through one or more wired/wireless input devices, e.g., a keyboard 1138 and/or a pointing device, such as a mouse 1140 or a touchscreen or touchpad (not illustrated). These and other input devices are often connected to the processing unit 1104 through an input device interface 1142 that is coupled to the system bus 1108, but can be connected by other interfaces, such as a parallel port, an IEEE 1394 serial port, a game port, a USB port, an infrared (IR) interface, etc. A monitor 1144 or other type of display device is also connected to the system bus 1108 via an interface, such as a video adapter 1146.

The computer 1102 can operate in a networked environment using logical connections via wired and/or wireless communications to one or more remote computers, such as a remote computer(s) 1148. The remote computer(s) 1148 can be a workstation, a server computer, a router, a personal computer, portable computer, microprocessor-based entertainment appliance, a peer device or other common network node, and typically comprises many or all of the elements described relative to the computer 1102, although, for purposes of brevity, only a memory/storage device 1150 is illustrated. The logical connections depicted comprise wired/wireless connectivity to a local area network (LAN) 1152 and/or larger networks, e.g., a wide area network (WAN) 1154. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 is connected to the local network 1152 through a wired and/or wireless communication network interface or adapter 1156. The adapter 1156 can facilitate wired or wireless communication to the LAN 1152, which can also comprise a wireless access point disposed thereon for communicating with the wireless adapter 1156.

When used in a WAN networking environment, the computer 1102 can comprise a modem 1158, or is connected to a communications server on the WAN 1154, or has other means for establishing communications over the WAN 1154, such as by way of the Internet. The modem 1158, which can be internal or external and a wired or wireless device, is connected to the system bus 1108 via the serial port interface 1142. In a networked environment, program modules depicted relative to the computer 1102, or portions thereof, can be stored in the remote memory/storage device 1150. It will be noted that the network connections shown are example and other means of establishing a communications link between the computers can be used.

The computer 1102 is operable to communicate with any wireless devices or entities operatively disposed in wireless communication, e.g., desktop and/or portable computer, server, communications satellite, etc. This comprises at least Wi-Fi and Bluetooth™ wireless technologies or other communication technologies. Thus, the communication can be a predefined structure as with a conventional network or simply an ad hoc communication between at least two devices.

Wi-Fi, or Wireless Fidelity networks use radio technologies called IEEE 802.11 (a, b, g, n, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10 BaseT wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "data store," data storage," "database," "cache," and substantially any other information storage component relevant to operation and functionality of a component, refer to "memory components," or entities embodied in a "memory" or components comprising the memory. It will be noted that the memory components, or computer-readable storage media, described herein can be either volatile memory or nonvolatile memory, or can comprise both volatile and nonvolatile memory. By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Figure 12:
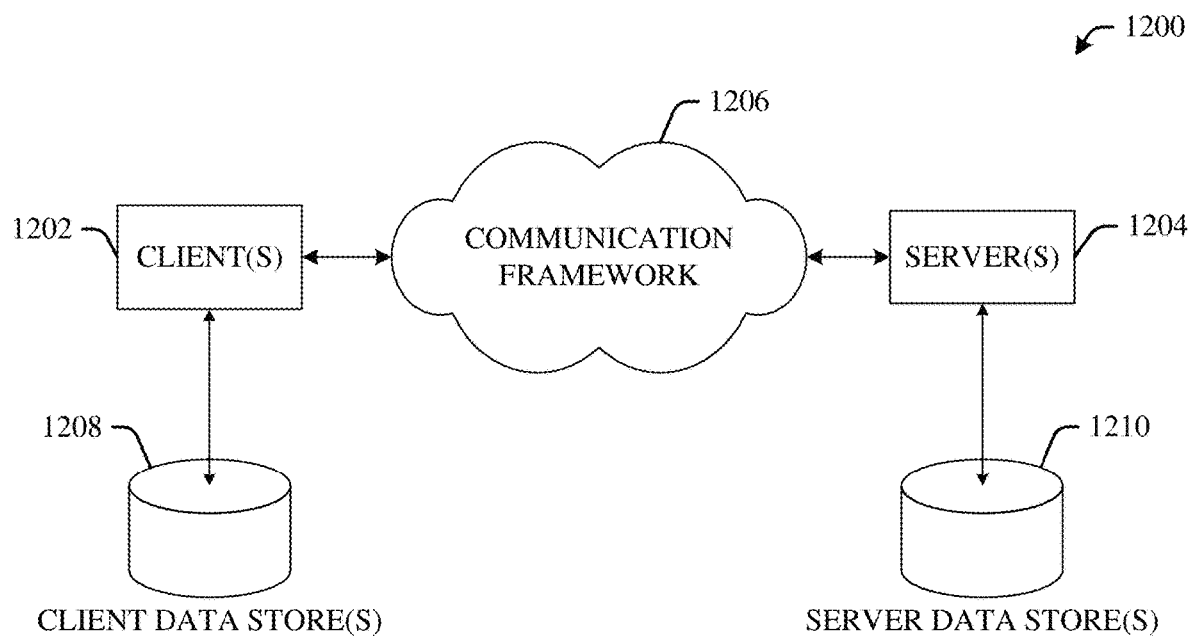
FIG. 12 illustrates a schematic block diagram of a computing environment in accordance with the subject specification.

Referring now to FIG. 12, there is illustrated a schematic block diagram of a computing environment 1200 in accordance with the subject specification. The system 1200 comprises one or more client(s) 1202. The client(s) 1202 can be hardware and/or software (e.g., threads, processes, computing devices).

The system 1200 also comprises one or more server(s) 1204. The server(s) 1204 can also be hardware and/or software (e.g., threads, processes, computing devices). The servers 1204 can house threads to perform transformations by employing the specification, for example. One possible communication between a client 1202 and a server 1204 can be in the form of a data packet adapted to be transmitted between two or more computer processes. The data packet may comprise a cookie and/or associated contextual information, for example. The system 1200 comprises a communication framework 1206 (e.g., a global communication network such as the Internet, cellular network, etc.) that can be employed to facilitate communications between the client(s) 1202 and the server(s) 1204.

Communications can be facilitated via a wired (comprising optical fiber) and/or wireless technology. The client(s) 1202 are operatively connected to one or more client data store(s) 1208 that can be employed to store information local to the client(s) 1202 (e.g., cookie(s) and/or associated contextual information). Similarly, the server(s) 1204 are operatively connected to one or more server data store(s) 1210 that can be employed to store information local to the servers 1204.

What has been described above comprises examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "comprises" is used in either the detailed description or the claims, such term is intended to be inclusive in a manner similar to the term "comprising" as "comprising" is interpreted when employed as a transitional word in a claim.

What is claimed is:

1. A system, comprising:
a processor; and
a memory that stores executable instructions that, when executed by the processor, facilitate performance of operations, comprising:
receiving sensor data captured via an Internet of things device operating in a mobility network and metadata about the Internet of things device, wherein the Internet of things device has coupled to network equipment, and wherein the metadata comprises first metadata representative of a sensor data collection capability of the Internet of things device and second metadata representative of a position of Internet of things device,
instantiating a first object node as a virtualized network function in a first service slice enabled via the mobility network for validation of the sensor data, wherein the first object node is selected based on the metadata,
assigning identifier data to the metadata, wherein the identifier data is associated with a category of first information used to tune a labeling process for the first object node and identify second information that is threshold likely to be of interest to a customer according to a defined likelihood criterion;
validating the sensor data by employing the first object node to classify the sensor data based on the metadata and the second information of the identifier data that has been identified to be threshold likely to be of interest to the customer, wherein the first object node comprises a first layer used to classify the data received in the first service slice, and wherein subsequent object nodes after the first object node are able to be instantiated in successive service slices, other than the first network slice, enabled via the mobility network; and
based on the validating, determining output data comprising the second information identified according to the defined likelihood criterion; and
in response to determining that the first object node has not classified the sensor data in accordance with a defined success criterion, classifying the sensor data based on determined label for the sensor data.

2. The system of claim 1, wherein the operations further comprise:
determining historical data associated with the identifier data, wherein the historical data has been stored within a network data store, and wherein validating the sensor data comprises validating the sensor data based on the historical data.

3. The system of claim 2, wherein determining the output data further comprises determining the output data based on the historical data.

4. The system of claim 1, wherein the first service slice comprises a virtualized network function slice enabled via the mobility network, and wherein the virtualized network function slice was instantiated based on the metadata.

5. The system of claim 4, wherein the metadata further comprises third metadata resulting from an operation of the Internet of things device.

6. The system of claim 1, wherein the operations further comprise:
in further response to determining that the first object node has not classified the sensor data in accordance with the defined success criterion, instantiating a second object node to classify the sensor data based on the determined label for the data.

7. The system of claim 1, wherein determining the output data further comprises determining the output data based on the second metadata associated with the position of the Internet of things device.

8. The system of claim 1, wherein the operations further comprise:
employing feedback data associated with the output data to update the first object node.

9. The system of claim 1, wherein the output data is provided to a network operations support system to facilitate a reduction in network congestion.

10. The system of claim 1, wherein the output data is renderable via an application programming interface that is integrated into a customer application.

11. A method, comprising:
receiving, by a system comprising a processor, sensor data that has been captured via an Internet of things device communicatively coupled to a mobility network and metadata about the Internet of things device, wherein the metadata comprises a sensor data collection capability of the Internet of things device and a location of Internet of things device;
facilitating, by the system, instantiating a first object node as a virtualized network function in a first service slice of the mobility network usable to validate the sensor data, wherein the first object node is selected based on the metadata;
assigning, by the system, identifier data to the metadata, wherein the identifier data is associated with a category of first information used to tune a labeling process for the first object node and identify second information likely to be of interest to a customer according to a defined likelihood criterion;
validating, by the system, the sensor data by employing the first object node to classify the sensor data based on the metadata and the identifier data, wherein the first object node comprises a first layer used to classify the data received in the first service slice, and wherein subsequent object nodes are able to be instantiated in successive service slices of the mobility network;
based on the validating, determining, by the system, output data comprising the second information identified according to the customer interest likelihood criterion; and
in response to determining that the first object node has not classified the sensor data in accordance with a defined success criterion, classifying, by the system, the sensor data based on a determined label for the sensor data.

12. The method of claim 11, further comprising: extracting, by the system, correlation information based on network information associated with a virtualized network function, and wherein the virtualized network function has been customized for a device category associated with the Internet of things device.

13. The method of claim 12, further comprising:
extracting, by the system, correlation information based on analytics data associated with the virtualized network function.

14. The method of claim 12, further comprising:
extracting, by the system, correlation information based on network traffic logs associated with the virtualized network function.

15. The method of claim 11, further comprising:
directing, by the system, the correlation information to a customer device via a cloud network associated with the customer.

16. The method of claim 11, further comprising: extracting, by the system, correlation information based on network intelligence data stored within a network data store that is part of the mobility network.

17. The method of claim 11, further comprising: extracting, by the system, correlation information based on the location of the Internet of things device.

18. A non-transitory machine-readable medium, comprising executable instructions that, when executed by a processor of control plane equipment, facilitate performance of operations, comprising:
receiving sensor data captured via an Internet of things device that is coupled to network equipment via a mobility network;
receiving metadata about the Internet of things device, wherein the metadata comprises first metadata indicative of a sensor data collection capability of the Internet of things device and second metadata indicative of a position of Internet of things device;
assigning identifier data to the metadata, wherein the identifier data is associated with a category of first information used to tune a labeling process for the first object node and determine second information likely to be of interest to a customer according to a defined likelihood criterion;
employing an instantiated object node of the network a virtualized network function in a first service slice of the mobility network to validate the sensor data based on the metadata and the identifier information, wherein the instantiated object node was selected based on the metadata, wherein the instantiated object node comprises a first layer used to classify the data received in the first service slice, and wherein subsequent object nodes are able to be instantiated in successive service slices of the mobility network;
based on the validating, determining output data comprising the information according to the defined likelihood criterion; and
in response to determining that the first object node has not classified the sensor data in accordance with a defined success criterion, classifying the sensor data based on a determined label for the sensor data.

19. The non-transitory machine-readable medium of claim 18, wherein the operations further comprise:
determining historical data associated with the identifier data, wherein validating the sensor data comprises validating the sensor data further based on the historical data.

20. The non-transitory machine-readable medium of claim 19, wherein determining the output data comprises determining the output data further based on the historical data.

* * * * *